(12) United States Patent
Perez et al.

(10) Patent No.: US 12,420,531 B2
(45) Date of Patent: Sep. 23, 2025

(54) PANEL FOR AIR-CONDITIONING DUCTS

(71) Applicant: SAINT-GOBAIN ISOVER, Courbevoie (FR)

(72) Inventors: Maria Luisa Perez, Madrid (ES); Alfonso Diez, Madrid (ES); Mariano Rico, Madrid (ES); Gregorio Lopez, Madrid (ES)

(73) Assignee: SAINT-GOBAIN ISOVER, Courbevoie (FR)

( * ) Notice: Subject to any disclaimer, the term of this patent is extended or adjusted under 35 U.S.C. 154(b) by 276 days.

(21) Appl. No.: 18/245,074

(22) PCT Filed: Sep. 14, 2021

(86) PCT No.: PCT/EP2021/075168
§ 371 (c)(1),
(2) Date: Mar. 13, 2023

(87) PCT Pub. No.: WO2022/053700
PCT Pub. Date: Mar. 17, 2022

(65) Prior Publication Data
US 2023/0364890 A1 Nov. 16, 2023

(30) Foreign Application Priority Data
Sep. 14, 2020 (FR) ...................................... 2009279

(51) Int. Cl.
*B32B 19/04* (2006.01)
*B32B 3/06* (2006.01)
(Continued)

(52) U.S. Cl.
CPC .............. *B32B 19/041* (2013.01); *B32B 3/06* (2013.01); *B32B 5/02* (2013.01); *B32B 7/12* (2013.01);
(Continued)

(58) Field of Classification Search
CPC ........... B32B 19/041; B32B 3/06; B32B 5/02; B32B 7/12; B32B 15/12; B32B 15/14;
(Continued)

(56) References Cited

U.S. PATENT DOCUMENTS

| | | | |
|---|---|---|---|
| 4,035,209 A | * | 7/1977 | Okawara .................... E04B 1/94 428/920 |
| 2007/0154695 A1 | * | 7/2007 | Soriano .................... B32B 5/024 428/292.1 |
| 2018/0031268 A1 | * | 2/2018 | Lopez Belbeze ... F24F 13/0281 |

FOREIGN PATENT DOCUMENTS

| | | |
|---|---|---|
| EP | 0 772 009 A1 | 5/1997 |
| EP | 1 532 391 A1 | 5/2005 |

(Continued)

OTHER PUBLICATIONS

International Search Report as issued in International Patent Application No. PCT/EP2021/075168, dated Dec. 7, 2021.
(Continued)

*Primary Examiner* — Michael Zhang
(74) *Attorney, Agent, or Firm* — Pillsbury Winthrop Shaw Pittman LLP (57) ABSTRACT

A panel for self-supporting ducts, in particular air-conditioning ducts, made up of a core of mineral wool, covered on its external face with an exterior covering joined to the external surface of the core, the exterior covering including a sheet of aluminum and the sheet of aluminum being the outermost sheet of the exterior stack, wherein the sheet of aluminum exhibits, at least on its outwardly exposed face, diffuse reflection greater than its specular reflection.

19 Claims, 4 Drawing Sheets

(51) Int. Cl.
  *B32B 5/02*    (2006.01)
  *B32B 7/12*    (2006.01)
  *B32B 15/12*   (2006.01)
  *B32B 15/14*   (2006.01)
  *B32B 15/20*   (2006.01)
  *B32B 19/06*   (2006.01)
  *F24F 13/02*   (2006.01)

(52) U.S. Cl.
  CPC .............. *B32B 15/12* (2013.01); *B32B 15/14* (2013.01); *B32B 15/20* (2013.01); *B32B 19/06* (2013.01); *F24F 13/02* (2013.01); *B32B 2250/40* (2013.01); *B32B 2262/02* (2013.01); *B32B 2262/101* (2013.01); *B32B 2262/108* (2013.01); *B32B 2307/102* (2013.01); *B32B 2307/416* (2013.01); *B32B 2307/538* (2013.01); *B32B 2307/71* (2013.01); *B32B 2607/00* (2013.01)

(58) Field of Classification Search
  CPC ..... B32B 15/20; B32B 19/06; B32B 2250/40; B32B 2262/02; B32B 2262/101; B32B 2262/108; B32B 2307/102; B32B 2307/416; B32B 2307/538; B32B 2307/71; B32B 2607/00; B32B 5/022; B32B 5/024; B32B 5/028; B32B 5/26; B32B 15/082; B32B 15/092; B32B 15/095; B32B 27/304; B32B 27/38; B32B 27/40; B32B 29/02; B32B 33/00; B32B 2307/304; B32B 2419/00; B32B 38/0012; F24F 13/02; E04C 2/292; E04C 2/523
  See application file for complete search history.

(56) References Cited

FOREIGN PATENT DOCUMENTS

| | | |
|---|---|---|
| EP | 1 592 853 A2 | 11/2005 |
| FR | 2 740 804 A1 | 5/1997 |
| FR | 2 993 200 A1 | 1/2014 |
| FR | 3 012 363 A1 | 5/2015 |
| FR | 3 074 091 A1 | 5/2019 |
| JP | S49-021341 A | 2/1974 |
| JP | 2018-507373 A | 3/2018 |
| WO | WO 2004/001277 A1 | 12/2003 |
| WO | WO 2004/072393 A2 | 8/2004 |
| WO | WO 2011/023807 A1 | 3/2011 |
| WO | WO 2018/109375 A1 | 6/2018 |

OTHER PUBLICATIONS

Office Action as issued in Japanese Patent Application No. 2023-516557, dated Jun. 24, 2025.

* cited by examiner

PANEL FOR AIR-CONDITIONING DUCTS

CROSS-REFERENCE TO RELATED APPLICATIONS

This application is the U.S. National Stage of PCT/EP2021/075168, filed Sep. 14, 2021, which in turn claims priority to French patent application number 2009279 filed Sep. 14, 2020. The content of these applications are incorporated herein by reference in their entireties.

The present invention relates to a panel for air ducts, more specifically to form ducts intended for the distribution of conditioned air.

The present invention relates quite particularly to ducts obtained from such panels. More particularly, the present invention relates to the field of ducts called the "self-supporting" field, since their mechanical rigidity characteristics are not provided by a metal inner tube or sheath but by a core of mineral fibers of high density. Such ducts are therefore devoid of such a metal sheath.

At the present time, the ducts provided for the distribution of conditioned air exposed to inclement weather are made up of modular prismatic tubular elements, most often made of sheet metal, which are suitably attach to one another and which do not leave the factory separate, so that they must be sheathed with a thermal insulation material during subsequent operations, with the consequent negative repercussion that this implies on costs.

In addition to this type of problem, there is also the fact that this type of "module" is extremely bulky, with the consequent problems that this entails from a transportation and storage viewpoint.

It is known that the conduction of an air flow in an installation for transporting conditioned air arranged inside (that is to say in a preserved medium of external climatic conditions) can also be carried out using ducts formed from a rigid structure manufactured with insulating panels, preferably made of glass wool or rock wool or more rarely of another similar fibrous material, successively coupled along paths of lengths that can sometimes go as far as the final space to be conditioned. Such a structure is for example described in applications EP1532391A1 or EP1592853A1 to which reference will be made for further details on such an implementation.

Currently, most self-supporting air conditioning ducts are manufactured and assembled as described in the previous publications from panels covered by an exterior covering (that is to say on the face of the panel intended to be positioned outward in the final duct). The purpose of this covering is to guarantee a finished product that is resistant to external attacks both mechanical and chemical, and also to propose an esthetically pleasing finished product. Currently, most exterior coverings use, as the outermost finishing layer, a layer made of aluminum, which may optionally be covered with a transparent anti-UV plastic film, in particular for outdoor use.

The aluminum layer generally used is of a conventional type and thus has, by nature, a high overall light reflection, which may pose problems of dazzling or visual fatigue, in particular when the ducts are paused for the operator tasked with making cuts, but also when integrating the ducts into their environment, in particular in the event of variations in the inside luminosity of the room or the room equipped with said duct or even sunshine conditions, in particular if the duct is installed outside.

The object of the present invention is to solve the above problems by proposing panels suitable for facilitating the manufacture of self-supporting ducts as well as said self-supporting ducts being easy to integrate in any type of environment. The object of the invention is more particularly to propose panels connected to one another according to the techniques already described, thus constituting conditioned air distribution ducts, all with easy, rapid and easy mounting while guaranteeing a product the aesthetics of which allow visual uniformity of the overall installation ultimately installed, independently of the lighting, whether outdoors or indoors.

More particularly, the present invention relates to a panel for self-supporting ducts, in particular air-conditioning ducts, made up of a core of mineral wool or the like, covered on its external face with an exterior covering joined to the external surface of the core, said exterior covering comprising a sheet of aluminum, said sheet of aluminum being the outermost (visible) sheet of the exterior covering, said panel being characterized in that the sheet of aluminum exhibits, at least on its outwardly exposed face (that is the one furthest from said core), diffuse reflection of visible light greater than its specular reflection.

Within the meaning of the present invention, the term "specular reflection" is conventionally understood to mean the portion of the incident radiation reflected by the surface of the sheet of aluminum in one and the same direction, according to the laws of Descartes, (angle of the symmetric reflected radiation of that of the incident radiation relative to the normal to the surface).

Diffuse reflection means the portion of the incident radiation reflected in all directions due to the heterogeneities of the medium. Such a diffuse reflection is in particular observed when the surfaces are rough or rendered rough, and that they exhibit asperities whose size is greater than the wavelength of the incident radiation.

The total reflection by the sheet of aluminum is the sum of the specular reflection and the diffuse reflection.

Total reflection, specular reflection, and diffuse reflection of visible light (380 nm-780 nm) can be measured by a conventional measuring device such as a spectrometer, for example a UV-Vis-NIR Perkin Elmer Lambda 900 absorption spectrometer equipped with an integrating sphere. According to the invention, the integration is therefore carried out over the entire visible range (380 nm-780 nm).

Certain preferred embodiments of the present invention are given below, which may of course be combined with one another, if necessary:

- The diffuse reflection of said outwardly exposed face of the sheet of aluminum is at least twice as great as its specular reflection, or even at least 3 times greater than its specular reflection.
- The diffuse reflection of said outwardly exposed face of the sheet of aluminum is greater than 50%, and preferably is greater than 60%, or even greater than 70%, and preferably is less than 90%.
- The specular reflection of said outwardly exposed face of the sheet of aluminum is less than 30% and preferably is less than 25%, or even less than 20%.
- The roughness parameter Sz of the outwardly exposed face of the sheet of aluminum, as measured according to the NF ISO 25178 standard, is greater than 20 micrometers and preferably is greater than 30 micrometers, or even greater than 40 micrometers.
- The roughness parameter SSk of the outwardly exposed face of the sheet of aluminum, as measured according to the NF ISO 25178 standard, is greater than 0.1 and preferably is greater than 0.2, or even greater than 0.3 or better still greater than 0.4.

The other face of the sheet of aluminum has a specular reflection greater than its diffuse reflection.

Alternatively, the other face of the sheet of aluminum may have a specular reflection less than its diffuse reflection.

The mineral wool core is covered on its interior face with an inner covering connected to the interior surface of the core and comprising an exterior sheet of aluminum, the sheet of aluminum having, on its face furthest from said core, a diffuse reflection greater than its specular reflection.

The exterior covering is composed of said sheet of aluminum, preferably reinforced by a mesh of reinforcing glass fibers.

The exterior covering comprises a sheet of kraft paper arranged below said sheet of aluminum and preferably adhesively bonded to the core of mineral fibers, said sheet of aluminum preferably being reinforced by a mesh of reinforcing glass fibers.

The external surface of the central core further comprises a mat of fiberglass or synthetic fibers, said mat preferably being bonded to the central core by the binder used for the crosslinking of the mineral fibers constituting said core, so that the panel comprises, from the external surface of the mineral wool core, the following steps:

said mat of fibers of fiberglass or of synthetic fibers, said exterior covering.

The exterior covering is covered with an anti-UV protective film, in particular chosen from the HRUV (highly resistant to ultraviolet) epoxy resins, urethanes, polyvinyl fluorides.

The panels terminate at their ends in edges to be interconnected.

The covering of the panel is extended in a flap so that, in an assembly situation with another module, it partially overlaps the covering of said module (and can thus be sealed with a tape optionally of the same material).

The invention also relates to a self-supporting duct manufactured from panels as described above and to the use of such panels for the manufacture of self-supporting ducts, in particular for dispensing air conditioning.

According to other particular and preferred (but non-restrictive) embodiments of the invention, which may, if applicable, be combined with one another:

The total thickness of the exterior covering is between 0.005 mm and 1 mm, more preferably between 0.05 mm and 0.50 mm.

The exterior covering and/or, where appropriate, the interior covering is adhesively bonded to the core by a polyurethane (PU), low-density polyethylene (LDPE), hot-melt adhesives or aqueous-based adhesives, preferably PU or LDPE.

The external surface of the central core further comprises a mat of fiberglass or synthetic fibers, said mat preferably being bonded to the central core by the same binder as that used for the crosslinking of the mineral fibers constituting said core.

The interior surface of the central core further comprises a mat of fiberglass or synthetic fibers, said mat preferably being bonded to the central core by the same binder as that used for the crosslinking of the mineral fibers constituting said core.

the panel successively comprises, from the external surface of the mineral wool core;

a glass fiber mat integrated into the mineral fibers constituting the core, a layer of an adhesive, in particular of the type of those described above, an exterior covering comprising at least one sheet of aluminum, optionally reinforced by a kraft paper by means of an adhesive and a fiberglass mesh, optionally a protective film consisting of an anti-UV protective film.

The panels terminate at their ends in edges to be interconnected.

As regards the connection means between the panels obtained, it has been provided that the latter have an interlocking profile, in order to obtain a sealed connection that is as perfect as possible. This way, it is possible to obtain, from initially flat panels, air ducts which may be exposed to bad weather, which are thermally insulated and have a covering which provides an absolute vapor barrier, which are extremely versatile, since they make it possible to obtain ducts with very varied dimensions and geometries from the same "universal" panel.

The covering of the panel is slightly extended in a flap so that, in an assembly situation with another module, it partially overlaps the covering of said module and is sealed with a tape of the same material.

The interior covering that determines the interior face of the duct extends beyond the edge of the panel, attaching to the surface that defines the connection profile.

The density of the mineral fiber core is between 50 kg/m$^3$ and 110 kg/m$^3$, preferably between 55 kg/m$^3$ and 80 kg/m$^3$.

A panel according to the invention may for example be a panel for external ducts, in particular for external air conditioning ducts and similar products.

The invention also relates to a self-supporting duct manufactured from panels as described above.

Finally, the invention relates to the use of panels described above for the manufacture of self-supporting ducts, in particular for distributing conditioned air.

To complete the preceding description of the present invention, and help to better understand the characteristics thereof, a preferred (but not limited) example of its practical embodiment is described below, in connection with the set of appended drawings, as an integral part of said description where, by way of non-limiting illustration, we have shown the following.

As can be seen in the aforementioned figures, the panel (1-1') according to the invention is formed from a mineral wool core (2-2') (glass wool or rock wool) or similar, which on its face considered external is covered with an exterior covering (3-3') allowing it to be mechanically and chemically resistant.

Within the meaning of the present invention, the terms "external", "exterior", "internal" and "interior" refer to the respective positions of the different components of the panel in the final duct, unless otherwise indicated.

Figure 1:
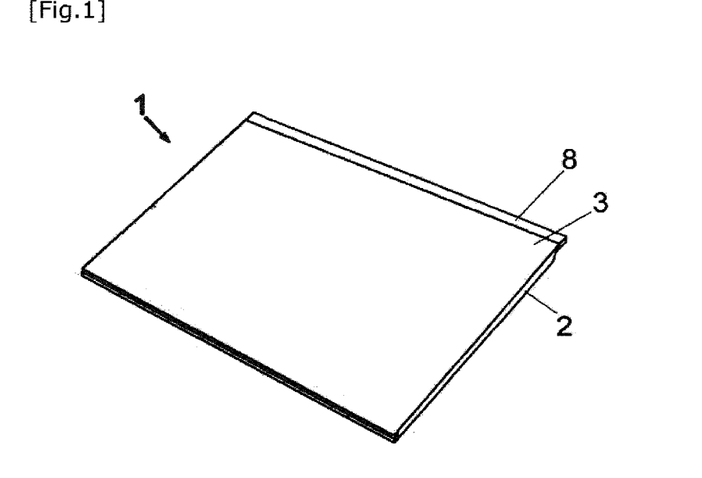
FIG. 1 shows a representation in perspective of a panel from which a module is obtained to constitute external air conditioning ducts, all achieved in accordance with the object of the present invention.
Figure 2:
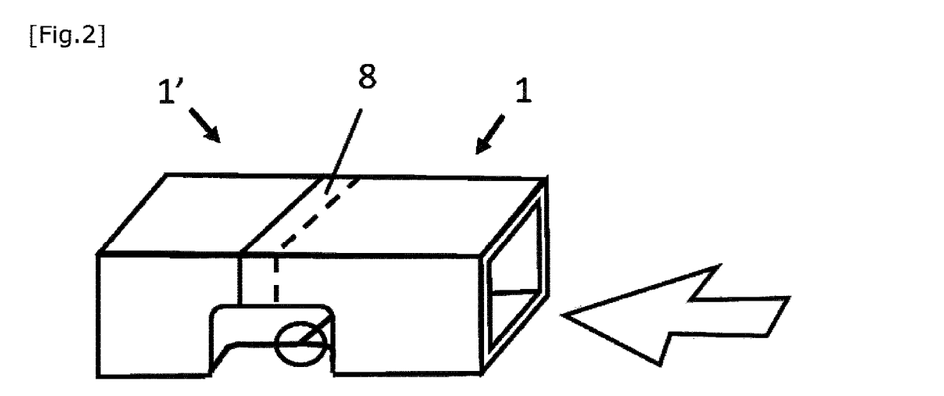
FIG. 2 shows a perspective view of the connection of two contiguous modules within a self-supporting duct according to the invention.
Figure 3:
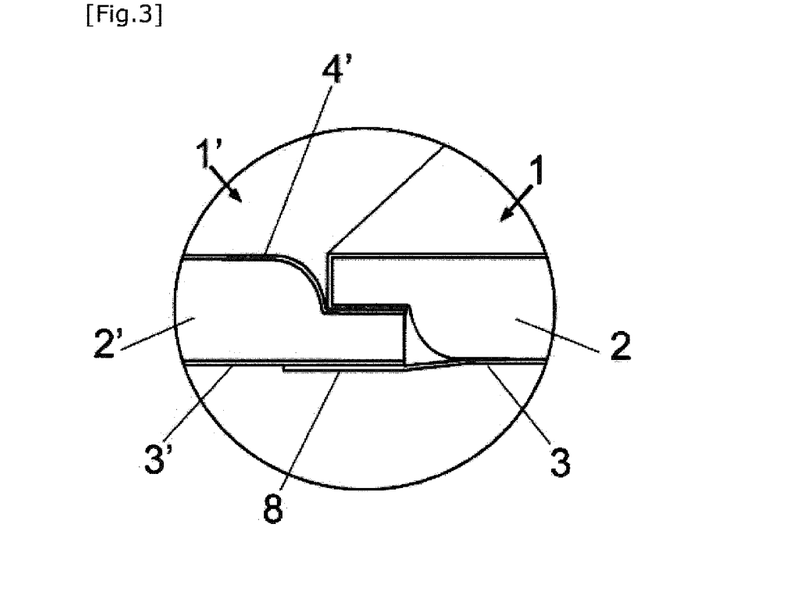
FIG. 3 shows an enlarged detail view of a first alternative embodiment of the connector shown in FIG. 2.
Figure 4:
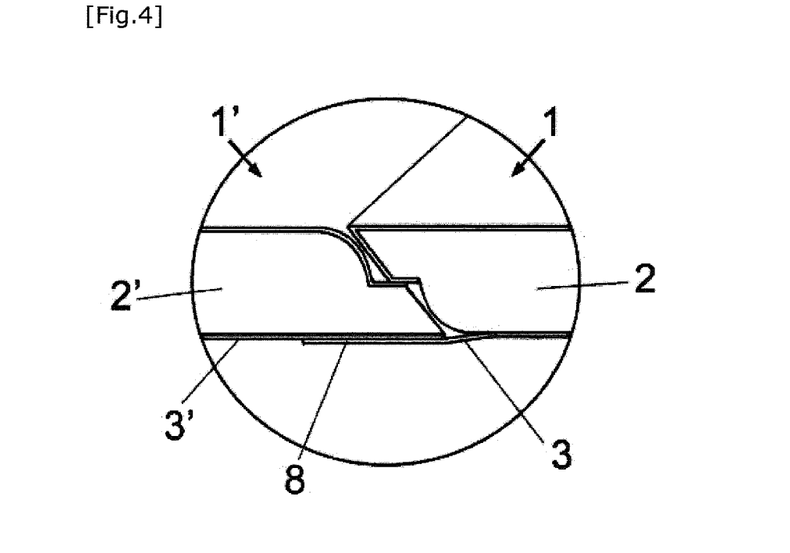
FIG. 4 schematically shows an enlarged detail view of a second alternative embodiment of the connector shown in FIG. 2.
Figure 5:
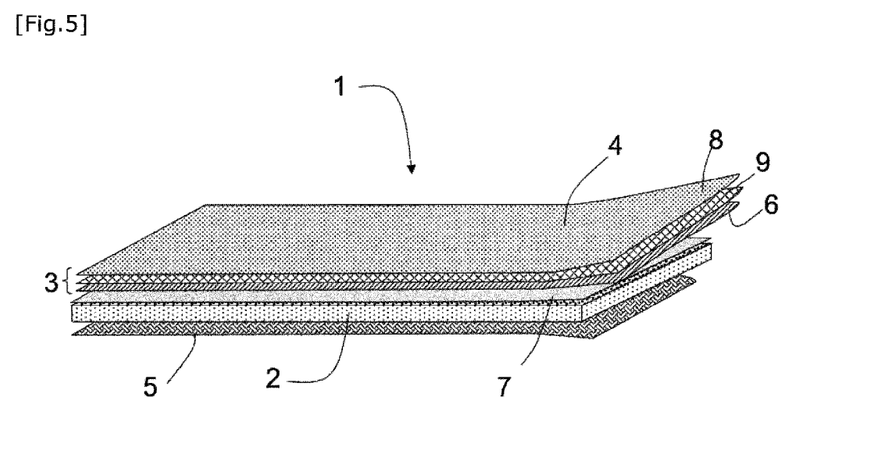
FIG. 5 shows an exploded view of all of the elements constituting the panel and the duct according to one embodiment of the invention.

FIGS. 1 to 4 describe the assembly and fitting of the panels according to the invention and such as, for example, illustrated by FIG. 5 in order to obtain self-supporting ducts. From this structure and with the appropriate cutting and folding tools, it is possible according to the invention to form, with a single type of panel, a multitude of types of types, configurations and different geometries, and this quickly and simply, as is in particular described in the publication EP 1-532-391 A1.

As regards the mode of connection between modules within the self-supporting ducts, provision may be made for the panels to terminate at their ends by edges to be interconnected, such as those shown in detail in FIGS. 3 and 4, so that preferably the multilayer exterior covering 3 is extended slightly into a flap 8 which partially overlaps the covering 3' of the contiguous module, thus preventing the water/moisture inlet. It is possible to use a tape of the same material as the covering.

This interconnection may be straight, as shown in FIG. 3, or oblique, as shown in FIG. 4, without affecting the essence of the invention.

As described below in greater detail in FIG. 5, according to one possible embodiment, the exterior covering 3 comprises a layer of kraft paper 6 covered with an exterior sheet of aluminum 4, the two elements preferably being bonded by an adhesive, said sheet of aluminum also being able to be reinforced by a mesh of reinforcing glass fibers 9 (a scrim layer) in order to form an FSK (foil-scrim-kraft) complex.

According to another configuration according to the invention, the coverings according to the invention may consist only of an aluminum sheet 4 preferably reinforced by mesh of reinforcing fibers 9, preferably glass fibers.

The assembly can be protected against ultraviolet rays by an additional film known to this end, as previously described (not shown in FIG. 5)

On the so-called interior face of the duct (with reference to its final position in the duct), the central core is covered, with a glass fabric 7, or with a single sheet of aluminum 5, optionally reinforced by a reinforcing mesh 9, one or more kraft paper-aluminum sheet combinations.

Optionally, a glass fabric or a glass mat 7 can also be attached to said core by means of an adhesive (not shown in the figures) or alternatively by the binder uniting the fibers of the mineral core to further improve the mechanical content of the duct, on one face or both faces of said core 2. In FIG. 5, the central core 2 made of mineral wool is bordered on its external face of a glass fiber fabric 7, in particular an Neto® fabric from the applicant company.

The opposite surface of the central core 2 can also be reinforced by means of another fiberglass mat 7 (not shown). According to a preferred embodiment, the mat or the glass fabric 7 is deposited on the external face of the core during the manufacture of the dense mat of mineral fibers, before the binder passes through the curing oven. In this way, a reinforcing mat is obtained that is integrated into the surface of the core made of mineral wool, that is to say bonded thereto by the same binder uniting the mineral fibers of the core, the reinforcement of which is thus improved.

A panel or duct according to the invention may of course comprise other additional elements, in particular additional layers and/or sheets entering the composition of the exterior covering 3.

On the external face of the central core 2, that is to say on the outwardly-turned face once the self-supporting duct is manufactured from the panel, the multilayer exterior covering 3 is positioned and bonded to the surface of the core, where appropriate via the reinforcement mat 7, via a layer of glue (not shown). This layer of glue is preferentially a glue of polyurethane but may also be chosen from adhesives made of Low-Density polyethylene (LDPE), hot-melt adhesives or water-based adhesives.

According to another possible embodiment, a layer of plastic material such as polyester then the UV protective film can first be placed above the sheet of aluminum 4, in particular of the type described above.

According to another configuration not described in FIG. 5 but included in the context of the present invention, the protective covering can comprise several aluminum films, for example two aluminum films, separated from one another by layers of plastic such as polyester.

According to the invention, the layers of plastic material are directly bonded to the film or to the aluminum films or alternatively via any adhesive known in the art to allow such a metal-plastic connection (not shown in FIG. 5).

Preferably, according to the invention, the total thickness of the covering 3 is between 5 microns and 1000 microns, preferably between 50 microns and 500 microns, and very preferably between 30 and 250 microns.

According to the invention, the sheet of aluminum 4 is configured to have a diffuse reflection greater than, or even very much greater than, the specular reflection.

In Table 1 below, the values of total reflection, specular reflection and diffuse reflection of a sheet of aluminum as sold currently and of a sheet of aluminum, configured according to the present invention, were transferred to increase the specular reflection (of visible light; between 380 nm and 780 nm).

The reflections (as a percentage of the incident light) were measured using a UV-Vis-NIR Perkin Elmer Lambda 900 spectrometer equipped with an integrating sphere of 150 mm for the visible range (380 nm-780 nm) with a step of 5 nm with an integration step of 0.26 second per measurement step. It is estimated that the accuracy of the measurement is ±0.15%. The reflections are measured with an incident angle of 8° (0° being the normal).

FIG. 6 illustrates the configuration used to measure the diffuse reflection and the total reflection of the visible light. FIG. 6 schematically shows the integrating sphere.

The sphere is equipped with two ports 11 and 12 and an opening to introduce the incident beam 13 into the latter.

Figure 6A:
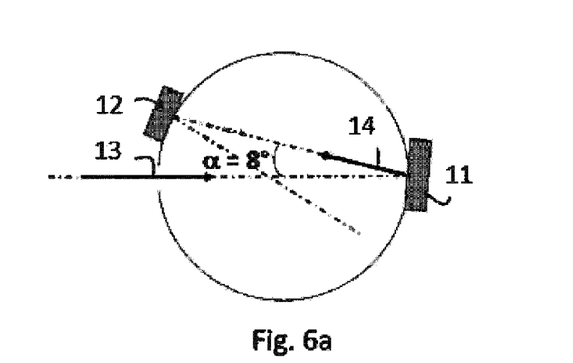
FIG. 6 illustrates the method used to measure the reflections according to the invention.

For the measurement of the total transmission (specular+ scattering), the sample is placed on the port 11 (where the port 11 is replaced by the sample), the port 12 remaining in place (FIG. 6a). The integrating sphere thus allows the total reflection of the light by the sample.

Figure 6B:
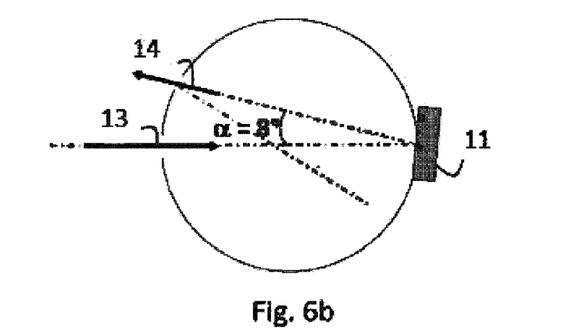

For the measurement of the diffuse transmission, the port 11 is also replaced by the sample, but the port 12 is removed (FIG. 6b). The beam 14 resulting from the specular reflection on the sample can thus escape from the sphere without entering into the measurement obtained by the integrating sphere.

The specular reflection is obtained by subtracting the diffuse reflection from the total reflection.

TABLE 1

|  | Total reflection $R_T$* | Diffuse reflection $R_D$ | Specular reflection $R_S$ |
|---|---|---|---|
| Sheet of aluminum according to the invention | 92 | 76 | 16 |

TABLE 1-continued

|  | Total reflection $R_T$* | Diffuse reflection $R_D$ | Specular reflection $R_S$ |
|---|---|---|---|
| Commercial sheet of aluminum | 90 | 28 | 62 |

*$R_T = R_D + R_S$

The roughness characteristics of the two sheet of aluminums were measured using a profilometer according to the NF ISO 25178 standard.

More precisely, the topography measurements were carried out using a STIL profilometer comprising an optical contactless sensor (confocal chromatic sensor). The measurement points were acquired on a square grid with a spacing of 1 µm. The images were acquired on a surface area of 5 mm×2.5 mm, avoiding printed topography lines, and then analyzed using the software MountainsMap Scanning Topography 7.4 from DigitalSurf. The surfaces were straightened with a plane and the roughness parameters finally calculated according to the NF ISO 25178 standard.

The values of the parameter Sz (which measures the maximum distance between a peak and a trough) and the parameter SSk (which measures the asymmetry (Skewess) of the surface studied) are reported in Table 2 below:

TABLE 2

|  | Sz (micrometers) | SSk |
|---|---|---|
| Commercial sheet of aluminum | 17 | 0.06 |
| Sheet of aluminum according to the invention | 48 | 0.43 |

It was then checked that the use of an aluminum covering whose characteristics meet the present invention has the following advantages:

for the installer, by reducing the reflection of the light and avoiding dangerous and uncomfortable reflections without direct exposure to light coming from the surface of the covering of the panel used. By minimizing the specular reflection in favor of a diffuse reflection, the visual comfort and visual fatigue of the installer or dazzle are improved. The safety of the installation is thus improved.

In addition, such work in a secure environment may be guaranteed regardless of the work area, in particular in any place (outside or inside), and regardless of the type of lighting (natural or artificial) and its intensity. It makes it possible in particular to work outside on sunny days, without intense reflections and by minimizing the reflection of light and heat.

It also makes it possible to improve the effectiveness of the work carried out, for example by guaranteeing greater precision in cutting, in particular if guiding lines are present on the surface of the panel to be cut out as described in publication WO 2004/001277, in particular improving the contrast between said cutting lines and the surface of the exterior aluminum covering.

The installation work is also made more efficient during cutting, by facilitating the figures of ducts both on the interior face if that face is also covered with a sheet of aluminum according to the invention whose diffuse reflection is greater than its specular reflection, in particular longitudinal cuts than on the external face of the panels, for the assembly of the figures.

The use of a sheet of aluminum according to the invention in the exterior covering also makes it possible to improve the aesthetics of the final installation since it contributes to the visual uniformity of the overall installation independently of the lighting (outside or inside) and of its intensity.

The invention claimed is:

1. A panel for a self-supporting duct made up of a mineral wool core, the mineral wool core having an external face covered with an exterior covering joined to the external surface of the mineral wool core, said exterior covering comprising a sheet of aluminum and said sheet of aluminum being an outermost sheet of the exterior covering and having an outwardly exposed face, wherein said sheet of aluminum has, at least on said outwardly exposed face, a diffuse reflection greater than its specular reflection, wherein the diffuse reflection of said outwardly exposed face of the sheet of aluminum is at least twice as great as its specular reflection.

2. The panel according to claim 1, wherein the diffuse reflection of said outwardly exposed face of the sheet of aluminum is greater than 50%.

3. A panel for a self-supporting duct made up of a mineral wool core, the mineral wool core having an external face covered with an exterior covering joined to the external surface of the mineral wool core, said exterior covering comprising a sheet of aluminum and said sheet of aluminum being an outermost sheet of the exterior covering and having an outwardly exposed face, wherein said sheet of aluminum has, at least on said outwardly exposed face, a diffuse reflection greater than its specular reflection, wherein the other face of the sheet of aluminum has a specular reflection greater than its diffuse reflection.

4. The panel according to claim 1, wherein the specular reflection of said outwardly exposed face of the sheet of aluminum is less than 30%.

5. The panel according to claim 4, wherein the specular reflection of said outwardly exposed face of the sheet of aluminum is less than 20%.

6. The panel according to claim 1, wherein a roughness parameter SSk of the outwardly exposed face of the sheet of aluminum, as measured according to the NF ISO 25178 standard, is greater than 0.1.

7. The panel according to claim 1, wherein the other face of the sheet of aluminum has a specular reflection less than its diffuse reflection.

8. The panel according to claim 1, wherein the mineral wool core is covered on its interior face with an inner covering connected to the interior surface of the core and comprising an exterior sheet of aluminum, the sheet of aluminum having, on its face furthest from said core, a diffuse reflection greater than its specular reflection.

9. The panel according to claim 1, wherein the exterior covering consists of said sheet of aluminum.

10. The panel according to claim 1, wherein said exterior covering comprises a sheet of kraft paper arranged below said sheet of aluminum.

11. The panel according to claim 1, wherein the outer surface of the mineral wool core further comprises a mat of fiberglass or synthetic fibers, said mat being bonded to the mineral wool core by a binder used for the crosslinking of the mineral fibers constituting said mineral wool core, so that the panel comprises, from the external surface of the mineral wool core:

said mat of fibers of fiberglass or of synthetic fibers,
said exterior covering.

12. The panel according to claim 1, wherein the exterior covering is covered with an anti-UV protective film.

13. The panel according to claim 1, wherein the panel terminates at its end in an edge to be interconnected.

14. The panel according to claim 1, wherein the covering of the panel is extended into a flap so that, in an assembly situation with another module, it partially overlaps the covering of said module.

15. The panel according to claim 1, wherein the self-supporting duct is an air-conditioning duct.

16. A self-supporting duct manufactured from panels according to claim 1.

17. A method comprising providing one or more panels according to claim 1 for the manufacture of a self-supporting duct.

18. A panel for a self-supporting duct made up of a mineral wool core, the mineral wool core having an external face covered with an exterior covering joined to the external surface of the mineral wool core, said exterior covering comprising a sheet of aluminum and said sheet of aluminum being an outermost sheet of the exterior covering and having an outwardly exposed face, wherein said sheet of aluminum has, at least on said outwardly exposed face, a diffuse reflection greater than its specular reflection, wherein a roughness parameter Sz of the outwardly exposed face of the sheet of aluminum, as measured according to the NF ISO 25178 standard, is greater than 20 micrometers.

19. The panel according to claim 2, wherein the diffuse reflection of said outwardly exposed face of the sheet of aluminum is greater than 70%.

\* \* \* \* \*